United States Patent Office 3,522,224
Patented July 28, 1970

3,522,224
PROCESS FOR PREPARING INTERPOLYMERS OF SYMMETRICAL DICHLOROETHYLENE
Gordon Y. T. Liu, Baton Rouge, La., and Coleman J. Bryan, Merritt Island, Fla., assignors to The Dow Chemical Company, Midland, Mich., a corporation of Delaware
No Drawing. Filed Sept. 18, 1967, Ser. No. 668,641
Int. Cl. C08f 15/06, 15/24, 15/28
U.S. Cl. 260—86.3                          2 Claims

ABSTRACT OF THE DISCLOSURE

This invention is directed to a process for enhancing the rate of polymerization when preparing interpolymers of symmetrical dichloroethylene in the presence of catalyst systems comprised of (1) a compound of a metal of Groups II–B, IV–A, IV–B, V–B, VI–B, VII–B and VIII (including thorium and uranium) of the Periodic System, (2) an organo metallic compound of an alkali metal, an alkaline earth metal, zinc or aluminum and (3) a complexing agent for the organometallic compound. Specifically, the process comprises (a) admixing the prescribed amounts of catalyst component (1) with the symmetrical dichloroethylene monomer, (b) admixing catalyst components (2) and (3) with the copolymerizable monomer, and (c) subsequently admixing the mixtures of (a) and (b) and thereafter polymerizing the same under autogenous pressure at a temperature between about 10 and 150° C.

---

It is known that highly crystalline polyvinyl chloride having an isotactic structure may be produced by polymerization using stereospecific catalyst systems composed of crystalline halides of transition metals such as violet titanium trichloride and aluminum trialkyl compounds with or without the presence of certain complexing agents for the organometallic constituent. It is also known that symmetrical dichloroethylene may be polymerized, or copolymerized with monomers such as vinyl chloride, in the presence of stereospecific catalyst systems based on organometallic compounds.

It has been discovered, which discovery comprises the present invention, that interpolymers of symmetrical dichloroethylene may be advantageously prepared using a catalyst formed by reacting (1) a compound of a metal of Groups II–B, IV–A, IV–B, V–B, VI–B, VII–B, and VIII (including thorium and uranium) of the Periodic System, (2) an organo metallic compound of an alkali metal, an alkaline-earth metal, zinc or aluminum, and (3) a complexing agent for the organometallic compound, as hereinafter defined; wherein the metal constituent of (1) is present in amounts of at least about 1 p.p.m. and preferably less than about 1000 p.p.m. and preferably between about 25 and 400 p.p.m., based on the weight of the liquid monomeric material; and wherein the organometallic compound (2) is present in amounts between about 0.5 and 15 moles per mole of (1); and further wherein the complexing agent (3) is present in amounts between about 0.2 and 30 moles per mole of (1).

More particularly, it has been unexpectedly found that the rate of polymerization of copolymers comprised of symmetrical dichloroethylene and a copolymerizable ethylenically unsaturated comonomer, such as vinyl chloride vinylidene chloride, vinyl acetate, vinyl propionate, vinyl butyrate, methyl methacrylate and ethyl acrylate, may be advantageously enhanced by (a) mixing the herein prescribed amounts of a compound of a metal of Groups II–B, IV–A, IV–B, V–B, VI–B, VII–B and VIII (including thorium and uranium) with the symmetrical dichloroethylene monomer, (b) mixing the herein defined organometallic compound and the complexing agent with the copolymerizable monomer, and (c) subsequently admixing the mixtures of (a) and (b), and thereafter polymerizing the same under autogenous pressure at a temperature of between about 10 and 150° C.

In the process of the present invention, any inorganic or organic salt or complex of the metals of Groups II–B, IV–A, IV–B, V–B, VI–B, VII–B or VIII (including thorium and uranium) of the Periodic Table of Deming, "Fundamental Chemistry," 2nd ed., published 1952 by John Wiley and Sons, Inc., New York, may be used. Thus, any compound of cadmium, zinc, tin, lead, titanium, zirconium, hafnium, thorium, vanadium, tantalum, chromium, molybdenum, tungsten, uranium, manganese, rhenium, iron or cobalt may be used. As purely exemplary of such compounds are cadmium chloride, zinc chloride, lead nitrate, titanium tetrachloride, zirconium tetrachloride, titanium trichloride, vanadium dichloride, bis (cyclopentadiethyl)-titanium dichloride, vanadium trichloride, vanadium tetrachloride, vanadium trifluoride, vanadium oxytrichloride, vanadium oxydichloride, tantalum pentachloride, molybdenum trichloride, molybdenum pentachloride, chromium dichloride, chromium trichloride, ferric chloride, manganese dichloride, vanadium trioxide, vanadium pentoxide, chromium oxide, vanadium oxyacetylacetonate, chromium acetylacetonate, cobalt acetylacetonate, iron acetylacetonate, manganese acetylacetonate, alkyl vanadates, alkyl titanates, among many others.

The above described compounds of metals of Groups II–B, IV–A, IV–B, V–B, VI–B, VII–B and VIII (including thorium and uranium) are used in amounts sufficient to provide at least about 1 p.p.m. and preferably less than 1000 p.p.m. of the indicated metal constituent of such compound, based on the weight of the hereinbefore defined monomeric material. More particularly, such compounds are generally economically and advantageously used in amounts sufficient to provide between about 25 and 400 p.p.m. of the metal constituent of such compound, based on the weight of the monomeric material. It has been found that catalyst systems containing less than about 1 p.p.m. of such metals, when used in conjunction with the total catalyst system as defined herein, do not effectively produce polymer, particularly if the materials to be polymerized are not substantially dry prior to mixture therewith. It has further been found that concentrations of the metal constituent of the above-defined compounds in excess of about 1000 p.p.m., based on the weight of the monomeric materials, tend to produce polymer which is often dark and which is difficultly separated from residual undesirable catalyst materials.

The organometallic constituent of the catalyst may be any organometallic compound of a metal of Groups I, II, or III of the Periodic System, i.e., an alkali metal, alkaline-earth metal, zinc, or aluminum, may be used. Exemplary of such organometallic compounds are the alkali metal alkyls or aryls such as amylsodium, phenylsodium, etc., dimethyl magnesium, diethyl magnesium, diethyl zinc, butyl magnesium chloride, ethyl magnesium chloride, phenyl magnesium bromide, trimethylaluminum, triethyl-aluminum, tripropylaluminum, tributyl aluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diisobutylaluminum chloride, diethylaluminum hydride, ethylaluminum hydride, diisobutylaluminum hydride, etc., and complexes of such organometallic compounds, as for example, sodium aluminum tetraethyl, lithium aluminum triethyl butyl, lithium aluminum trioctyl butyl, lithium aluminum tetraoctyl, sodium aluminum triethyl chloride, etc.

As previously stated, the molar ratios of the organometallic compound to the metals of Groups II-B, IV-A, IV-B, V-B, VI-B, VII-B or VIII of the Periodic System may be varied between about 0.5 and 15 moles of the herein defined organometallic compound per mole of the above-identified compounds of the metals of Groups II-B through VII-B and VIII. Molar ratios less than those stated herein are generally not sufficient for reaction and molar ratios in excess of those stated herein often result in a disadvantageously slow rate of polymerization.

Suitable complexing agents, which are believed to function as electron donors to form chelate-type complexes with the organometallic compound, are ethers, alkylene oxides, tertiary amines, esters, ketones and nitro aromatics. Exemplary of the complexing agents that have been found to be particularly effective are: diethyl ether, tetrahydrofuran, 2-methyltetrahydrofuran, triethyl amine, ethylene oxide, and ethyl acetate. Just what may be the function of the complexing agent is not completely understood but it is believed that it forms a complex with the organometallic compound to prevent undesirable side reactions which might otherwise take place between the organometallic compound and the monomer or polymer. As stated herein the molar ratios of the complexing agent to the compounds of the metals of Groups II-B, IV-A, IV-B, V-B, VI-B, VII-B and VIII of the periodic System may be varied between about 0.2 and 30 moles of such complexing agent per mole of the indicated compounds. Molar ratios less than those defined herein are generally insufficient for polymerization and molar ratios in excess of those stated herein are unnecessary and may substantially retard polymerization rates. It has further been found that the utilization of ethylene oxide as the complexing agent, either alone or in combination with one or more of the other complexing agents as herein described, often significantly increases the molecular weight of the polymeric materials of the present invention, and/or the rate of polymerization of the required monomeric materials.

The selection of the temperature used for the polymerization process will obviously depend upon the activity of the catalyst system being used and the degree of polymerization desired. In general, the polymerization will be carried out at temperatures between about 10° C. and 150° C., and preferably between about 30° C. and 70° C. Below about 10° C. polymerization virtually ceases, whereas temperatures above about 150° C. often significantly degrade the so-formed polymeric material. In the same way, while autogenous pressures are generally used, the polymerization may be carried out under a wide range of pressures, as for example, from a partial vacuum up to as much as about 1000 pounds. Higher pressures may, of course, be used but generally do not appreciably alter the course of the polymerization.

Further, it has been found that the polymerization may be carried out with or without the use of added diluent or solvent; however, it is often advantageous to employ conventionally used diluents such as isoctane and the like to retard reactor fouling (i.e. polymer or copolymer build-up on the reactor walls), and for ease in the handling and mixing of the herein described components of the catalyst system.

It has also been found that best results are obtained if essentially all water i.e. less than about 50 p.p.m. of water based on the total composition weight) and traces of iron are removed from the herein defined monomeric materials prior to polymerization, as such impurities often tend to seriously retard the polymerization rates and have an adverse effect on the thermal stability of the desired polymeric materials.

It has further been found that the presence of conventionally used polymerization inhibitors, i.e. phenol and methyl ethyl hydroquinone, and the like, in the monomer constituents have little or no effect on polymerization rates unless present in amounts greater than about 200 p.p.m., based on the weight of the monomer.

The interpolymers produced in accordance with the present invention are solid, high melting, easily processable polymeric materials having significantly improved resistance to heat. Hence, such polymers have a wide range of application as coatings, film, flexible articles such as floor covering, and rigid and semi-rigid articles such as pipe and bottles, among many other uses, and are particularly suitable for use in extrusion and coating applications. It is to be recognized, however, that added stability or processability may be obtained by the addition to such polymers of conventionally used additives including plasticizers and/or heat and light stabilizers.

The following example, wherein all parts and percentages are to be taken by weight, illustrates the present invention but is not to be construed as limiting its scope.

EXAMPLE

In Experiment No. 1, 0.24 gram of titanium tetrachloride was placed in a clean, dry, glass bottle containing 120 grams of trans-symmetrical dichloroethylene. To a separate bottle was sequentially added 1.20 grams of diethyl aluminum chloride, 0.48 gram tetrahydrofuran and 180 grams of vinyl chloride. Each bottle was shaken vigorously, then the contents of each combined under substantially air-free conditions. The bottle containing the mixture was then capped and placed on a shaker in a constant temperature bath and maintained at a temperature of 50° C. for a period of 17.5 hours. At the end of the reaction period the bottle was opened, allowed to cool and the so-formed polymeric material washed with methanol and dried under reduced pressure at 50° C. for a period of about 16 hours; after which it was formulated with 0.5 part by weight of mineral oil and 3 parts by weight of an organo, tin stabilizer.

In Experiment No. 2, 0.24 gram of titanium tetrachloride was placed in a glass bottle containing 240 grams of a mixture of trans and cis-symmetrical dichloroethylene, and to a separate bottle was sequentially added 1.20 grams of diethyl aluminum chloride, 0.24 gram of tetrahydrofuran, 0.24 gram of ethylene oxide and 960 grams of vinyl chloride. Each of the bottles was then shaken and admixed as per Experiment 1, and the mixture polymerized at a constant temperature of 35° C. for a period of 20.5 hours, after which it was cooled, washed, dried and formulated as per Experiment No. 1.

By way of comparison, in Experiment No. 3, 0.24 gram of titanium tetrachloride was added to a clean, dry, glass bottle followed by the sequential addition of 0.24 gram of tetrahydrofuran, 0.24 gram of ethylene oxide and 1.20 grams of diethyl aluminum. The mixture was then shaken vigorously to insure uniform mixing of the catalyst components. To the mixture was then added 240 grams of cis-symmetrical dichloroethylene followed by the addition of 960 grams of vinyl chloride monomer under substantially air-free conditions. The bottle containing the mixture was then placed on a shaker in a constant temperature bath and reacted at 35° C. for a period of 20.5 hours, after which it was cooled, washed, dried and formulated as per Experiment No. 1.

The following Table I illustrates the monomer and catalyst concentrations; the polymerization reaction conditions used; and the physical properties of the so-formed polymeric material.

In Table I the physical properties of the indicated polymeric materials were determined essentially as described herein.

Viscosity—Number of centipoises of a 2.0 percent solution of polymer in orthodichlorobenzene at 120° C.
Tensile strength—ASTM Test No. D638–61T.
Elongation—ASTM Test No. D638–61T
Heat distortion Temp., ° C.—ASTM Test No. D648–56
Wt. percent conversion of monomer to polymer—Total of polymer divided by total monomer charge×100 divided by the total reaction time.

The data of Table I illustrates the significant increase in the rate of polymerization achieved by utilization of the process of this invention. Specifically, a comparison of the weight percent conversion of Experiment 1 and Experiment 3 shows a greater than three-fold increase in the polymerization rate; whereas a comparison of Experiment 2 with Experiment 3 shows a two-fold increase in the rate of polymerization with no adverse effect upon the polymer properties.

Similar good results are obtained as described herein using any of the prescribed monomer combinations, catalyst systems and polymerization techniques.

TABLE I

|  | Experiment No. | | |
|---|---|---|---|
|  | 1 (the invention) | 2 (the invention) | 3 (for comparison) |
| Polymerization charge, grams: | | | |
| $TiCl_4$ | 0.24 | 0.24 | 0.24 |
| Diethyl aluminum chloride | 1.20 | 1.20 | 1.20 |
| Tetrahydrofuran | 0.48 | 0.24 | 0.24 |
| Ethylene oxide | 0 | 0.24 | 0.24 |
| VCl | 180 | 960 | 960 |
| Sym. dichloroethylene | [1] 120 | [2] 240 | [3] 240 |
| Reaction Conditions: | | | |
| Temp., ° C | 50 | 35 | 35 |
| Time, hrs | 17.5 | 20.5 | 20.5 |
| Polymer Properties: | | | |
| Yield, grams | 38 | 100 | 56 |
| M.P., ° C | 185 | 190 | 195 |
| Viscosity, centipoises | 0.75 | 1.07 | 1.10 |
| Percent chlorine | 58 | 58 | 58.6 |
| Tensile strength, p.s.i.×$10^3$ |  | 8.1 | 6.3 |
| Elongation, percent |  | 4 | 0 |
| Heat distortion, ° C |  | 71.5 | 74.5 |
| Wt. percent conversion of monomer to polymer/hr | 0.72 | 0.41 | 0.23 |

[1] trans.
[2] Mixed cis and trans.
[3] cis.

What is claimed is:

1. In the process of copolymerizing symmetrical dichloroethylene monomer with at least one other ethylenically unsaturated monomer selected from the group consisting of vinyl chloride, vinylidene chloride, vinyl acetate, vinyl propionate, vinyl butyrate, methyl methacrylate and ethyl acrylate in the presence of a catalyst composed of:
(1) titanium tetrachloride, (2) diethyl aluminum chloride and (3) a complexing agent for said diethyl aluminum chloride selected from the group consisting of tetrahydrofuran and ethylene oxide; wherein (1) is present in amounts of at least about 1 p.p.m. based on the weight of the monomeric materials; wherein (2) is present in amounts between about 0.5 and 15 moles per mole of (1); and wherein (3) is present in amounts between about 0.2 and 30 moles per mole of (1), the improvement consisting of: separately preparing a mixture (a) composed of said symmetrical dichloroethylene monomer and catalyst component (1) and a mixture (b) composed of said other ethylenically unsaturated monomer with catalyst components (2) and (3), then combining mixtures (a) and (b) and thereafter interpolymerizing the same under autogenous pressure at a temperature between about 10 and 150° C.

2. The process of claim 1 wherein the polymerization is conducted in the absence of additional solvents and diluents.

References Cited

UNITED STATES PATENTS

| 2,267,712 | 12/1941 | Bauer | 260—91.7 |
| 3,210,329 | 10/1965 | Jenkins. | |
| 2,938,889 | 5/1960 | Krespan | 260—87.5 |
| 3,255,164 | 6/1966 | Visger et al. | |

HARRY WONG, JR., Primary Examiner

U.S. Cl. X.R.

260—87.1, 87.5